United States Patent [19]

Bergström

[11] 4,254,333
[45] Mar. 3, 1981

[54] OPTOELECTRONIC CIRCUIT ELEMENT

[76] Inventor: Arne Bergström, Ängsövägen 7, 180 10 Enebyberg, Sweden

[21] Appl. No.: 911,134

[22] Filed: May 31, 1978

[51] Int. Cl.³ .............................................. G01V 9/04
[52] U.S. Cl. .................................... 250/221; 250/227
[58] Field of Search ............... 250/221, 222, 227, 229, 250/239; 340/365 P

[56] References Cited

U.S. PATENT DOCUMENTS

| | | | |
|---|---|---|---|
| 3,673,327 | 6/1972 | Johnson et al. | 250/221 |
| 4,068,222 | 1/1978 | Treviranus | 250/221 |

*Primary Examiner*—David C. Nelms
*Attorney, Agent, or Firm*—Holman & Stern

[57] ABSTRACT

In an optoelectronic circuit element for effecting a manually controlled output signal comprising at least one radiation-emitting element, a radiation-propagating unit and at least one radiation-sensitive element, the radiation-propagating unit being a solid body which is transparent to the radiation in question and which has an interface which is exposed to radiation from the radiation-propagating unit, an identifiable change in the state of the radiation-sensitive element is effected by changes in the conditions for total internal reflection of the radiation at the interface arising from contact of an actuating body, say a finger, with said interface.

13 Claims, 4 Drawing Figures

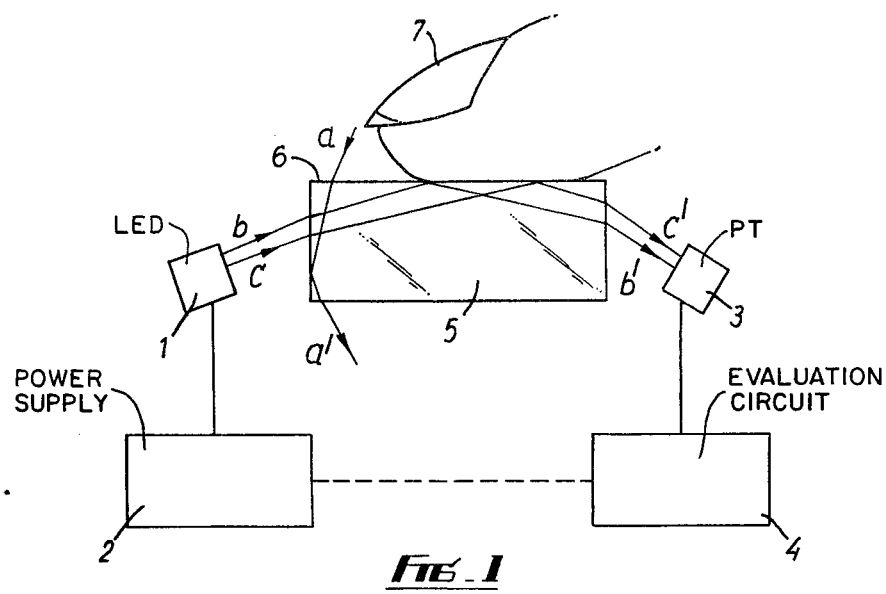
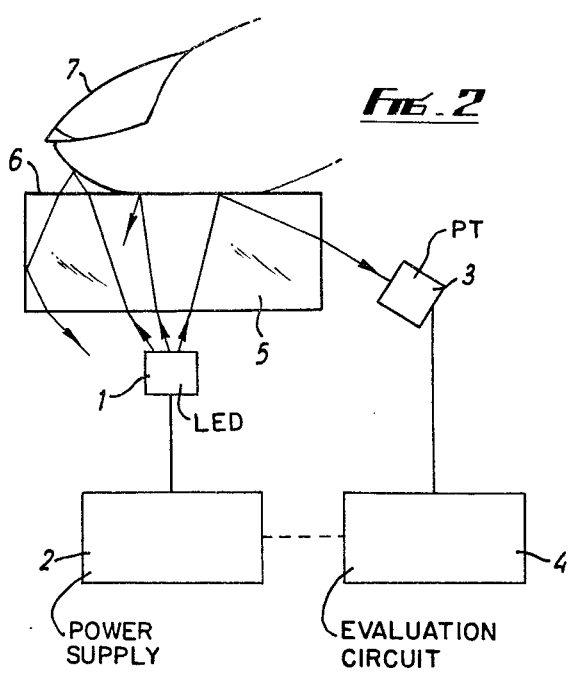

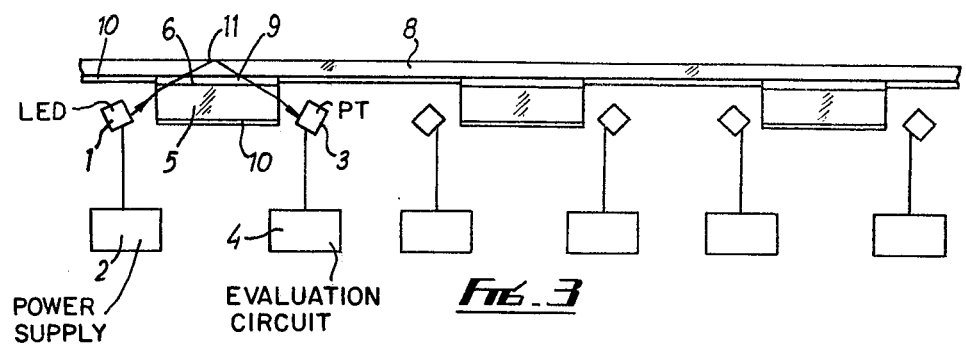
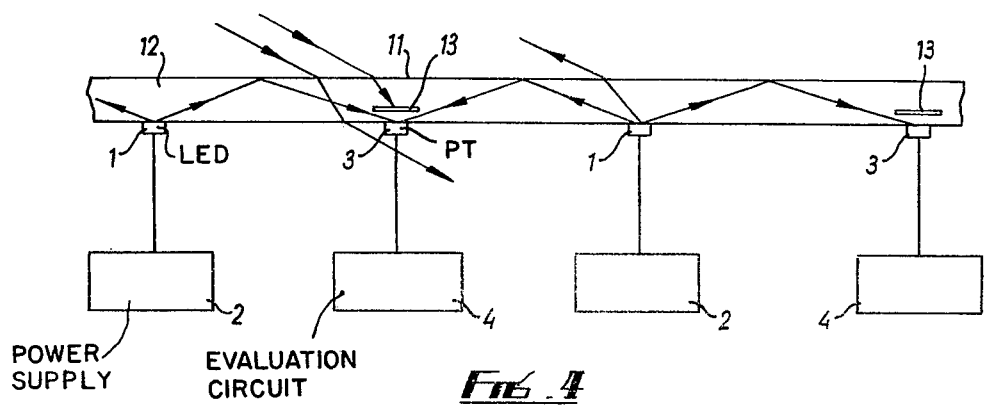

OPTOELECTRONIC CIRCUIT ELEMENT

The present invention relates to an optoelectronic circuit element for effecting a manually controlled output signal.

An optoelectronic circuit element of the type to which the invention relates comprises at least one radiation-emitting element, a radiation-propagating unit, and at least one radiation-sensitive element, where the radiation-emitting element is arranged to transmit radiation via the radiation-propagating unit to the radiation-sensitive element and the two elements are so positioned in relation to said unit that an identifiable change in the state of the radiation-sensitive element can be induced by means of an external actuating body, for example a fingertip.

Man-to-machine communication has until recently been implemented mainly by means of mechanical devices, such as push buttons, rheostats etc. for controlling electrical systems. Even though such mechanical constructions are often of a very simple design, it would be advantageous to have, as control elements in electrical systems, devices having no moving parts, hence not subjected to wear, and in which the electrical system is hermetically sealed from the surroundings so that it is also of application, for example, in deep water or in environments having high concentrations of acids or other chemicals.

Several principles for manual switches without moving parts are known, and some have found commercial use. Two types of touch keys devoid of moving parts and based on conductive and capacitive principles have been adopted during the last few years as channel selectors for television sets. In the conductive type, a circuit is closed by the conductivity of the skin. Since the circuit is closed exactly when the finger touches the contact electrodes, this principle leads to a very distinct function. A marked disadvantage with touch keys of the conductive type is, however, their high sensitivity to humidity which causes stray currents between the control electrodes and easily induces inadvertent switching operations. In the capacitive type, the presence of a finger changes the capacitance between two capacitor plates, usually placed some distance apart behind a flat glass or plastic surface. In a related type of touch key, for example, as used in elevators, the presence of a finger changes the inductance of a coil in a tuning circuit. The sensitivity to humidity is less pronounced for the capacitive and inductive types of touch keys, and by a suitably designed logic in the evaluating circuit, such touch keys can be made to function satisfactorily, even under comparatively damp conditions. Since the changes occasioned by the presence of a finger are small for all three types of touch keys, that is to say those operating according to conductive, capacitive, and inductive principles, the evaluation circuits are very sensitive and have to be carefully discriminated against electrical disturbances. Also, the operation of all three types is based on the conductive and capacitive properties of the actuating finger, that is to say on its water content, and the discrimination against other forms of water, moisture and the like thus requires a complex logic and cannot be guaranteed in all situations.

Several types of manual switches having no moving parts and based on optoelectronic principles have also been previously suggested, the passage of a light beam between a light source and a photocell being interrupted by means of a finger (German Patent Specification Nos. 1,490,947, 1,490,948, British Patent Specification No. 1,246,295), or light from a light source reflected in the finger being detected by a photocell (German Patent Specification No. 1,566,695, British Patent Specification No. 1,246,296). A difficult problem with optoelectronic manual switches is that of obtaining a reliable discrimination against interferences from external light sources, for example from the sun, which problem is a limiting factor in the practical use of the designs suggested. These principles also do not permit a particularly distinct function; and switches constructed in accordance therewith may easily be inadvertently actuated by foreign objects.

As is apparent from the above survey of previously known principles for manual switches having no moving parts, such switches attempt, simultaneously, to satisfy two conflicting requirements, namely to be sensitive to the mere touch of a finger, and, at the same time, to be insensitive to other external factors which might mimic the actuating criterion. The purpose of the present invention is to attain, by a new principle of operation, an optoelectronic circuit element which can be used both in a switch function and in a rheostat function, and which, to a much higher degree than previously known constructions, is selectively sensitive to touch by fingers and insensitive to various forms of external disturbances.

According to the present invention, there is proposed an optoelectronic circuit element particularly a touch key, for effecting a manually controlled output signal comprising at least one radiation-emitting element, a radiation-propagating unit, and at least one radiation-sensitive element, where the radiation-emitting element is arranged to transmit radiation via the radiation-propagating unit to the radiation-sensitive element and the two elements are so positioned in relation to said unit that an identifiable change in the state of the radiation-sensitive element can be induced by means of an external actuating body, preferably a fingertip, wherein the radiation-propagating unit is a solid body, transparent to the radiation used, having a touch surface which is the interface between an optically tenuous, external medium, usually air, and an optically denser medium, preferably glass, in the unit and which surface is exposed to radiation from the radiation-emitting element, wherein said identifiable change in the state of the radiation-sensitive element is induced only when the actuating body is applied in direct contact with said touch surface of the radiation-propagating unit and effected by the change in the conditions for total internal reflection of the radiation at the touch surface on contact, and wherein with respect to the critical angle for total internal reflection at the touch surface, only the radiation transmitted from the radiation-emitting element via the touch surface itself is used for the function of the circuit element, stray radiation penetrating through the touch surface from external sources, or radiation reflected in the actuating body when this body is not in direct contact with the touch surface, being unable to reach the radiation-sensitive element either directly or via refractions or reflections at the interfaces of the radiation-propagating unit. Since the operation of the circuit element according to the invention is effected only when an actuating body, such as a fingertip, is applied in direct contact with the touch surface of the radiation-propagating unit, a very distinct function, insensitive to external radiation, electromagnetic fields and other disturbances, is attained. The circuit element having no moving parts, it can be made hermetically sealed from the environment. By a suitable choice of radiation-propagating unit, it can also be made exceedingly resistant against mechanical damage, against high pressures, heat, and against acids and other chemicals, and thus work also, e.g., in deep water or in other extreme environments. A further advantage with the circuit element according to the invention is its simple design, suitable for mass production and miniaturization. Since the circuit element is based on an optical principle it is also directly applicable as manual control element in fibre optical circuits.

A switch function can be effected by means of the optoelectronic circuit element according to the invention if the identifiable change in the state of the radiation-sensitive element when the actuating body is applied in direct contact with the touch surface is utilised by means of a connected evaluation circuit to effect an "on" or "off" state of a consumer circuit. With the advantages mentioned above, a switch of this type has a wide range of applications, e.g. as touch keys in television sets and studio equipment, as switches in damp environments, etc.

A rheostat function can be effected by means of the optoelectronic circuit element according to the invention if the identifiable change in the conditions for total internal reflection of the radiation at the touch surface is continuously variable by means of the actuating body, so that a continuous variation of the reflected radiation detected by the radiation-sensitive element is obtained with the object of effecting, by means of a connected evaluation circuit, a continuous control of the state of a consumer circuit. This principle provides technical means of replacing a large number of input keys by only one input unit, which could make far-reaching miniaturization possible. Since the input keyboard in many cases, e.g. for electronic pocket calculators, is the size-limiting factor, this principle might make it possible, for instance, to incorporate mini-calculators in electronic watches, to use fingertip-sized input units to television games, etc. In an input unit of this type, based on the rheostat function of the invention, the finger is shifted over the touch surface, and—depending on how large a portion of the active touch surface the finger is in contact with—a corresponding digit (or operation) is indicated on, e.g., a display. When the desired digit/operation has been selected in this manner, it is then inputted by a second manual step, e.g. through a design of the connected evaluation circuit so that locking and registration of the signal is effected upon a swift, harder pressure of the fingertip against the touch surface, or by swiftly lifting the finger from the touch surface. With an evaluation circuit of this type, the rheostat version of the circuit element according to the invention can be used also for replacing, by components without moving parts, the mechanical rheostats which are now used in e.g., volume, bass, and treble controls in radio and television receivers.

In a preferred embodiment of the invention, the radiation-propagating unit consists of a glass prism in the shape of a rectangular parallelepiped with one of the surfaces of the prism forming a touch surface for the actuating body and with an index of refraction so chosen with respect to the external medium adjoining the touch surface that, due to the conditions for total internal reflection at the surfaces of the prism, the radiation which passes through the touch surface, and the surface of the prism which is parallel to the touch surface, is optically separated from the radiation which passes through the surfaces of the prism which are perpendicular to the touch surface. By choosing a glass (or epoxy resin) with sufficiently high index of refraction, this separation principle can be used for the discrimination against external light also with water as the external medium outside the touch surface of the prism.

In another preferred embodiment of the invention, the radiation-propagating unit is fitted with at least one shading device which, in relation to the radiation-sensitive element and to said touch surface, is so arranged with respect to the critical angle for total internal reflection at the touch surface that external radiation penetrating through the touch surface does not reach the radiation-sensitive element. This embodiment provides a method for mass production by using printing methods to apply the shading pattern. A potential application is, e.g. display screens with input capability when a large number of circuit elements of the type discussed are to be applied on a surface in the form of a screen pattern.

With regard to the position of the radiation-emitting element and the radiation-sensitive element in relation to the radiation-propagating unit, two different embodiments of the optoelectronic circuit element according to the invention can be distinguished, corresponding to different modes of operation. In the first embodiment, the radiation-emitting element and the radiation-sensitive element are so positioned in relation to the radiation-propagating unit that radiation from the radiation-emitting element passes through the touch surface and that, on applying the actuating body in direct contact with the touch surface, this radiation is partly reflected, with the object of actuating the radiation-sensitive element, via the actuating body into the radiation-propagating unit within an angular sector at the touch surface within which otherwise only radiation subjected to total internal reflection at this surface can exist. In the second embodiment, the radiation-emitting element and the radiation-sensitive element are so positioned in relation to the radiation-propagating unit that radiation from the radiation-emitting element is subjected to total internal reflection at the touch surface of the unit in direction towards the radiation-sensitive element and that, on applying the actuating body against the touch surface within the range of the evanescent wave from this surface, the total internal reflection of the radiation at the touch surface is attenuated, with the object of actuating the radiation-sensitive element, by partial absorption of the radiation in the actuating body. Of the two embodiments, the second can normally work on a lower intensity level of the radiation than the first. Concerning the first embodiment it should be noted that the reflective power of fingertips are high for all human beings. The skin of the inside of the extremities has a thicker corneous layer over the melanin pigment-forming layer than elsewhere on the body; thus even races with very dark skin have whitish palms and fintertips.

In the implementation with a glass prism in the shape of a rectangular parallelepiped as radiation-propagating unit, the radiation-emitting element is, in the first embodiment, directed towards the surface of the prism which is parallel to the touch surface of the prism, and the radiation-sensitive element directed towards a surface of the prism which is perpendicular to the touch surface. In the second embodiment, the radiation-emitting element is directed towards a surface of the prism which is perpendicular to the touch surface of the prism, and the radiation-sensitive element is directed towards the surface of the prism which is parallel to said surface perpendicular to the touch surface of the prism. The design principle of the first embodiment can be used, e.g. to construct large touch keyboards, where a number of light sources corresponding to the various keys are fitted behind a large, plane-parallel glass plate, and with a light-sensitive element directed towards one of the plane edges of the plate to detect the radiation field inside the plate parallel to the touch surface. When the finger touches the touch surface, light from the light source behind the plate is reflected by the finger into this radiation field and is identified (possibly after multiple total internal reflections) in the light-sensitive element by a multiplexing technique. By a construction of this type and with the picture flying-spot as the multiplexed light source, the finger can also be used like a light pen on television screens and computer displays, where in this way an input capability can be achieved, replacing light pens and external keyboards by touch keys on the screen itself, the positions and functions of which can be programmed just like the other information on the screen. The design principle of the second embodiment can be used, e.g. to construct another type of large touch keyboard, where the radiation field inside a large, plane-parallel glass plate forms a light-beam matrix, invisible from the outside, the rows and columns of which are formed by a number of light source—light detector pairs directed towards the plane edges of the plate and transmitting light through the edges via multiple total internal reflection in the upper and lower surfaces of the plate. Touching the upper surface of the plate at the intersection between a row and column beam reduces the total internal reflection of these two beams which is used for key identification.

In another preferred embodiment of the invention, one or more similar circuit elements are so arranged against a preferably plane-parallel plate, transparent to the radiation used and preferably of glass, that every circuit element is attached in optical contact with one of the plane surfaces of the plate, and that the other plane surface of the plate then serves as touch surface. This embodiment is particularly useful for small-scale production, e.g. of tailored control panels, or in combination with the above embodiments.

In the case where the radiation used in short-wave electromagnetic radiation, it is advantageous that the radiation-emitting element consists of a light-emitting diode and the radiation-sensitive element consists of a photo-transistor.

In order to achieve further discrimination against external radiation penetrating through the touch surface into the radiation-propagating unit, the radiation emitted from the radiation-emitting element can be intensity modulated and the radiation-sensitive element selectively sensitive to this intensity modulated radiation, and/or the radiation-sensitive element can be arranged in feedback with the radiation-emitting element. In this way a considerably lower power consumption is required at the same level of discrimination against external light.

The invention will now be described further, by way of example only, with reference to the accompanying drawings in which:

FIGS. 1 and 2 show two preferred embodiments of the circuit element according to the invention with a glass prism in the shape of a rectangular parallelepiped as radiation-propagating unit;

FIG. 3 shows an arrangement having several circuit elements according to FIG. 1 attached in optical contact with a plane-parallel glass plate; and FIG. 4 shows another embodiment of the circuit element according to the invention with a radiation-propagating unit in the form of a plane-parallel glass plate fitted with shading devices.

The same reference numbers are used for corresponding details in the various figures.

Referring now to the drawings, and particularly to FIG. 1 thereof, an optoelectronic circuit element according to the invention comprises a light-emitting diode 1 defining the radiation-emitting element, such diode being connected to an electric power supply 2, a photo-transistor 3 defining the radiation-sensitive element, such photo-transistor being connected to an electric evaluation circuit 4, and a glass prism 5 in the shape of a rectangular parallelepiped and defining the radiation-propagating unit. One of the plane surfaces of the prism, hereafter called touch surface 6, forms an interface against an optically tenuous medium, usually air, outside the prism. The light-emitting diode 1 is directed towards one of the side faces of the prism 5 perpendicular to the touch surface 6, and transmits light at an oblique angle towards the touch surface 6, where it is subjected to total internal reflection and then exits through the opposite side face of the prism, towards which side face the photo-transistor 3 is directed.

The function of the circuit element according to FIG. 1 is based on the following principle, here illustrated in the case of electromagnetic radiation. When a plane, electromagnetic wave travelling in a medium encounters an interface against an external medium in which its wave velocity is different, it is separated partly into a refracted wave penetrating into the external medium, and partly into a reflected wave which, after reflection at the interface, continues in the original medium. The angles $\theta_i$, $\theta_t$, and $\theta_r$, which the incident, refracted, and reflected waves, respectively, form with the normal to the interface in the respective medium, obey the following relationships.

$$\sin \theta_t / \sin \theta_i = n \text{ (Snell's Law)}, \qquad (1)$$

$$\theta_r = \theta_i \text{ (law of reflection)}, \qquad (2)$$

where n is the index of refraction, i.e. the ratio between the wave velocities in the external and internal media.

If the internal medium is optically denser than the external medium, i.e. n>1, equation (1) gives real angles $\theta_t$ only for $\theta_i \leq \arcsin(1/n)$, while for $\theta_i > \arcsin(1/n)$ total internal reflection occurs. If, specifically, as for the circuit element according to FIG. 1, the internal, optically denser medium is in the shape of a rectangular parallelepiped and $n > 1/\sin(\pi/4) = \sqrt{2}$, then, due to the conditions for total internal reflection at the surfaces of the prism 5, the radiation which passes through the touch surface 6, and the surface of the prism 5 which is parallel to the touch surface 6, is optically separated from the radiation which passes through the surfaces of the prism 5 which are perpendicular to the touch surface 6. A light beam a-a', incident from the outside in such a direction that, upon refraction in the touch surface 6, it meets one of the side surfaces perpendicular to the touch surface 6, is therefore always totally reflected at this side surface and then exits through the surface parallel to the touch surface 6. The photo-transistor 3, which is directed towards one of said side surfaces of the prism 5, is thus—apart from possible diffusion of light in the glass—completely protected against external light penetrating through the touch surface 6, and which otherwise would interfere with the function of the circuit element. Thus, with adequate light shielding of the side surfaces of the prism, including the light-emitting diode and the photo-transistor, the light incident upon the photo-transistor exclusively consists of light emitted from the light-emitting diode and then totally reflected in the touch surface 6. In FIG. 1 this is depicted by the light beam b-b' and c-c'.

At total internal reflection, the field in the external medium does not completely vanish, however. Instead of the propagating wave in normal refraction, there appears at total internal reflection a so-called evanescent wave, decaying exponentially from the interface 6 into the external medium and with a penetration depth of the order of the wave-length of the radiation. By studying the component of the Poynting vector perpendicular to the interface 6, it can be seen that energy is pumped back and forth between the interface 6 and the evanescent wave, but that—contrary to the case of a propagating wave in ordinary refractionl—the time-integrated energy flux out through the interface 6 is zero at total internal reflection (see e.g., M Born and E. Wolf: "Principles of Optics", Pergamon Press 1959, p. 47-49; cf. also A I Mahan and C. V. Bitterli, Applied Optics 17, p. 509 (1978)). However, if an absorbing medium, such as a finger, is applied against the interface 6 within the range of the evanescent wave from this surface, the conditions are changed and part of the energy which otherwise would have been pumped back to the interface 6 from the evanescent wave, is now instead absorbed by the finger 7, resulting in an intensity degradation of the totally reflected wave. This is a wave optical equivalent to the tunnel effect of quantum mechanics, i.e. photons "tunnel" over to the absorbing medium and in this way disappear from the totally reflected wave.

Through the physical principle described, the intensity of the light which reaches the photo-transistor 3 after total internal reflection at the touch surface 6, can thus be varied by means of a finger 7, applied in contact with the touch surface 6. The larger the part is of the effective touch surface that the finger 7 is applied against, or the harder the finger 7 is pressed against the touch surface 6, the higher is the light absorption in the finger, which results in a lower intensity of the light reaching the photo-transistor; the corresponding change in the electrical state of the photo-transistor is evaluated by the evaluation circuit 4 connected to the photo-transistor 3.

In order to achieve further discrimination against external radiation, which penetrates through the touch surface 6 and might disturb the function of the circuit element through possible light diffusion in the glass, the light emitted from the light-emitting diode is intensity modulated, and/or the photo-transistor 3 is arranged in electrical feedback with the light-emitting diode 1; in FIG. 1 this is marked by a dashed line.

FIG. 2 shows an embodiment of the optoelectronic circuit element according to the invention which differs from that shown in FIG. 1 only as regards the position of the light-emitting diode 1, the changed position providing another mode of operation. In contradistinction to FIG. 1, the light-emitting diode 1 of FIG. 2 is directed towards that surface of the glass prism 5 parallel to the touch surface 6. Due to the optical separation discussed above between the wave systems passing through the horizontal and the vertical surfaces, respectively, of the prism 5, neither the light emitted from the light-emitting diode 1, nor refractions or reflections of external light penetrating through the touch surface 6, will normally be able to reach the photo-transistor 3. If, however, in order to actuate the circuit element a finger 7 is applied against the touch surface 6, photons will, analogously to what was discussed above in connection with FIG. 1, be able to "tunnel" over from the finger to the prism within an angular sector at the touch surface within which otherwise only radiation subjected to total internal reflection at this surface can exist. In practice, this means that light from the light-emitting diode 1 will be reflected by the finger 7 at the very interface of the prism so that an optical communication is established between the two wave systems mentioned above, with the result that light reaches the photo-transistor 3. Consequently, it is also in this case possible to effect, by means of a finger 7, a continuous variation of the electrical state of the photo-transistor 3 for the purpose of effecting a variable input signal to the connected evaluation circuit 4.

FIG. 3 shows a construction comprising three optoelectronic circuit elements of the type depicted in FIG. 1. The interface 6 of each prism 5 is here attached in optical contact with one of the surfaces of a plane-parallel glass plate 8, preferably, by means of an optical cement. The radiation-propagating unit in each circuit element in this embodiment thus consists of a glass prism 5 and the glass plate 8 in optical contact. The plane surface of the glass plate 8, against which the prisms 5 are attached, is covered by light-absorbing paint 10 at those parts thereof which are not in contact with the glass prisms 5. Preferably, that surface of each glass prism 5 which is parallel to the interface 6 is also covered by light-absorbing paint 10. The actuation of one of the circuit elements in the construction shown in FIG. 3 is accomplished by applying a finger in contact with corresponding touch surface 11, which is the part of the surface of the glass plate 8, where the light from the light-emitting diode in question is totally reflected before it reaches the photo-transistor 3 in the circuit element. The position of the touch surface 11 of each circuit element can be marked by a digit or other symbol, applied in the optical cement directly below the corresponding touch surface 11, in which position it does not interfere with the beam path in the circuit element.

FIG. 4 shows another embodiment of the circuit element according to the invention. The construction according to FIG. 4 comprises a plane-parallel glass plate 12, against one surface of which light-emitting diodes 1 and photo-transistors 3 are arranged in alternating sequence in optical contact with the glass. Shading devices 13 are provided within the glass plate 12, a respective such device being positioned directly in front of each photo-transistor 3 and the devices being so dimensioned with regard to the critical angle for total internal reflection in the plane surface of the glass prism 12 that external radiation, refracted in these surfaces, cannot reach the corresponding photo-transistor 3. In contrast to this, the photo-transistors 3 are affected by light which is emitted by the neighbouring light-emitting diodes 1 and then totally reflected in the other plane surface of the glass plate 12, which surface serves as touch surface 11. This total internal reflection of the light emitted from the light-emitting diodes 1 can then be attenuated by applying a finger 7 in contact with the touch surface 11, where the total internal reflection occurs. The function of this embodiment is analogous to that described above in connection with FIG. 1.

The invention is not limited to the exact features of the embodiments hereindisclosed, since alternatives will readily present themselves to one skilled in the art. Optical radiation is in the present context defined as radiation of wave nature, displaying the refraction and reflection properties required for the function of the circuit element. Hence, instead of visual light of IR radiation, microwave or ultrasound radiation can be used. Also, the manual actuation could be effected by other means than a fingertip, e.g. by a soft rubber body manipulated manually over the touch surface, and which could provide the rheostat version of the circuit element with a hardware memory function. In embodiments having a rectangular parallelepiped as a radiation-propagating unit, a comparatively thin, plane-parallel plate can be used, so that multiple reflection of the radiation occurs in the touch surface and the surface parallel to the touch surface, whereby the effect of the change in the conditions for total internal reflection at the touch surface is accentuated, or whereby the radiation-sensitive element can be placed at a considerable distance from the touch surface. In embodiments having a rectangular parallelepiped as a radiation-propagating unit, it is also possible to use two orthogonal wave systems through, respectively, the opposite pairs of side surfaces of the parallelepiped perpendicular to the touch surface. As discussed above, these two wave systems will be optically separated from each other and from external radiation penetrating through the touch surface. By means of such an arrangement of radiation-emitting and radiation-sensitive elements, as is herein proposed, it is possible to attain, by means of, for example, a finger, a two-dimensional rheostat function, which function corresponds to the function attained by so-called joy sticks in complicated control equipment. In embodiments with shading devices in the radiation-propagating unit, the radiation-emitting elements and the radiation-sensitive elements can, in addition to an alternating sequence in a quadratic pattern, also be arranged in, for example, a hexagonal pattern with each radiation-emitting element surrounded by six radiation-sensitive elements, or vice versa. As alternatives to light-emitting diodes, the radiation-emitting elements may take the form of incandescent lamps or phosphorescent paint may be used, whilst photodiodes, selenium- or cadmiumsulphide cells may be used as radiation-sensitive elements in lieu of the photo-transistors specifically disclosed.

What I claim is:

1. An optoelectronic circuit element, particularly a touch key, for effecting a manually controlled output signal comprising at least one radiation-emitting element, a radiation-propagating unit, and at least one radiation-sensitive element, where the radiation-emitting element is arranged to transmit radiation via the radiation-propagating unit to the radiation-sensitive element and the two elements are so positioned in relation to said unit that an identifiable change in the state of the radiation-sensitive element can be induced by means of an external actuating body, preferably a fingertip, wherein the radiation-propagating unit is a solid body, transparent to the radiation used, having a touch surface which is the interface between an optically tenuous, external medium, usually air, and an optically denser medium, preferably glass, in the unit and which surface is exposed to radiation from the radiation-emitting element, wherein said identifiable change in the state of the radiation-sensitive element is induced only when the actuating body is applied in direct contact with said touch surface of the radiation-propagating unit and effected by the change in the conditions for total internal reflection of the radiation at the touch surface on contact, and wherein with respect to the critical angle for total internal reflection at the touch surface, only the radiation transmitted from the radiation-emitting element via the touch surface itself is used for the function of the circuit element, stray radiation penetrating through the touch surface from external sources, or radiation reflected in the actuating body when this body is not in direct contact with the touch surface, being unable to reach the radiation-sensitive element either directly or via refractions or reflections at the interfaces of the radiation-propagating unit.

2. An optoelectronic circuit element according to claim 1, wherein, in order to effect a switch function, said identifiable change in the state of the radiation-sensitive element when the actuating body is applied in direct contact with the touch surface is utilised by means of a connected evaluation circuit to effect an "on" or "off" state of a consumer circuit.

3. An optoelectronic circuit element according to claim 1, wherein in order to effect a rheostat function, said identifiable change in the conditions for total internal reflection of the radiation at the touch surface is continuously variable by means of the actuating body, so that a continuous variation of the reflected radiation detected by the radiation-sensitive element is obtained with the object of effecting, by means of a connected evaluation circuit, a continuous control of the state of a consumer circuit.

4. An optoelectronic circuit element according to claim 1, wherein the radiation-propagating unit consists of a glass prism in the shape of a rectangular parallelepiped with one of the surfaces of the prism forming a touch surface for the actuating body and with an index of refraction so chosen with respect to the external medium adjoining the touch surface that, due to the conditions for total internal reflection at the surfaces of the prism, the radiation which passes through the touch surface, and the surface of the prism which is parallel to the touch surface, is optically separated from the radiation which passes through the surfaces of the prism which are perpendicular to the touch surface.

5. An optoelectronic circuit element according to claim 1, wherein the radiation-propagating unit is fitted with at least one shading device which, in relation to the radiation-sensitive element and to said touch surface, is so arranged with respect to the critical angle for total internal reflection at the touch surface that external radiation penetrating through the touch surface does not reach the radiation-sensitive element.

6. An optoelectronic circuit element according to claim 1, wherein the radiation-emitting element and the radiation-sensitive element are so positioned in relation to the radiation-propagating unit that radiation from the radiation-emitting element passes through the touch surface and that, on applying the actuating body in direct contact with the touch surface, this radiation is partly reflected, with the object of actuating the radiation-sensitive element, via the actuating body into the radiation-propagating unit within an angular sector at the touch surface within which otherwise only radiation subjected to total internal reflection at this surface can exist.

7. An optoelectronic circuit element according to claim 1, wherein the radiation-emitting element and the radiation-sensitive element are so positioned in relation to the radiation-propagating unit that radiation from the radiation-emitting element is subjected to total internal reflection at the touch surface of the unit in direction towards the radiation-sensitive element and that, on applying the actuating body against the touch surface within the range of the evanescent wave from this surface, the total internal reflection of the radiation at the touch surface is attenuated, with the object of actuating the radiation-sensitive element, by partial absorption of the radiation in the actuating body.

8. An optoelectronic circuit element according to claim 4, wherein the radiation-emitting element is directed towards the surface of the prism which is parallel to the touch surface of the prism, and the radiation-sensitive element is directed towards a surface of the prism which is perpendicular to the touch surface.

9. An optoelectronic circuit element according to claim 4, wherein the radiation-emitting element is directed towards a surface of the prism which is perpendicular to the touch surface of the prism, and the radiation-sensitive element is directed towards the surface of the prism which is parallel to said surface perpendicular to the touch surface of the prism.

10. An optoelectronic circuit element according to claim 1, wherein one or more similar circuit elements are so arranged against a preferably plane-parallel plate, transparent to the radiation used and preferably of glass, that every circuit element is attached in optical contact with one of the plane surfaces of the plate, and that the other plane surface of the plate then serves as touch surface.

11. An optoelectronic circuit element according to claim 1, wherein the radiation-emitting element consists of a light-emitting diode and the radiation-sensitive element consists of a photo-transistor.

12. An optoelectronic circuit element according to claim 1, wherein in order to achieve further discrimination against external radiation penetrating through the touch surface into the radiation-propagating unit, the radiation emitted from the radiation-emitting element is intensity modulated and the radiation-sensitive element is selectively sensitive to this intensity modulated radiation.

13. An optoelectronic circuit element according to claim 1, wherein in order to achieve further discrimination against external radiation penetrating through the touch surface into the radiation-propagating unit, the radiation-sensitive element is arranged in feedback with the radiation-emitting element.

* * * * *